COUNTER SYSTEM AND MAGNETIC CORE RESET CIRCUIT THEREFOR

Filed March 7, 1966

INVENTOR.
ROLAND T. ROGERS
BY
Samuelson & Jacob
ATTORNEYS 3,444,538

COUNTER SYSTEM AND MAGNETIC CORE RESET CIRCUIT THEREFOR

Roland T. Rogers, West Milford, N.J., assignor, by mesne assignments, to Amerace Esna Corporation, New York, N.Y., a corporation of Delaware Filed Mar. 7, 1966, Ser. No. 532,361
Int. Cl. G11b *5/62*
U.S. Cl. 340—174 15 Claims The invention relates to counter systems utilizing magnetic memory devices of the toroidal core type and to a magnetic core reset circuit therefor.

In counters which utilize magnetic memory devices of the accumulating toroidal core type, it is important that there be no stored pulses in any of the cores when a new count is started. Such a counter has been described in my copending application, Ser. No. 391,104, filed Aug. 21, 1964, and now U.S. Patent No. 3,377,582 assigned to the assignee hereof.

In counters of this type, there is no output pulse from one core to the next or to a display or other output until the necessary number of count pulses have been applied to the core. As a consequence, it is necessary to bring all the stages of such a counter back to zero count before starting a new count.

In such a counter system, it is important that there be no spurious pulses applied to the magnetic memory devices of the counter and that all the pulses be of the proper polarity, amplitude and pulse width. To that end, the counter system of the invention utilizes the magnetic memory devices and counter described in application Ser. No. 391,104, now Patent No. 3,377,582, the low frequency oscillator described in my application Ser. No. 532,163, filed of even date herewith, entitled Low Frequency Transistor Relaxation Oscillator, now Patent No. 3,364,441, and the pulse shaper described in my application Ser. No. 532,360, filed of even date herewith, entitled, Monostable Multivibrator Pulse Shaper.

Broadly, the invention relates to a counter system utilizing one or more of my improved, toroidal core magnetic memory devices to produce one or more outputs after a predetermined number of count pulses have been applied to the input of the counter. Normally, the first stage transmits a pulse to the second stage after the required number of pulses have been applied to the first stage and the first stage core has saturated. This action takes place successively so that each succeeding core receives one pulse each time the preceding core saturates. The various stages may be adjusted so that each saturates after a predetermined number of count pulses. The number of count pulses necessary for saturation of one stage need not be the same as the number required for the saturation of any other stage.

In addition, an output signal may be derived from each stage so that a switch is operated, a display is actuated, or another action takes place when the core of that stage saturates. In order to guarantee that the count starts at zero in all stages at the commencement of a count cycle, it is necessary to first reset all the cores to zero. The circuit employed to reset the cores must be such that it is not affected by voltage changes and thereby apply a false reset pulse to the counter.

It is an important object of the invention to provide a counter system in which the counter has one or more stages utilizing magnetic memory devices having a plurality of windings wound on a toroidal core.

It is a further object of the invention to provide such a system wherein a series of pulses are applied to the memory device of a stage and the core saturates when a predetermined number of pulses have been applied to the stage.

It it a still further object of the invention to provide such a system wherein one or more output signals may be derived therefrom.

It is a still further object of the invention to provide a circuit to reset all the stages to zero count upon the commencement of a new count.

It is a still further object of the invention to provide such a circuit wherein changes in supply voltage will not actuate the reset circuit.

It is a still further object of the invention to provide such a reset circuit which may be actuated by a predetermined triggering pulse.

These and other objects, advantages, features and uses will be apparent during the course of the following description when taken in conjunction with the accompanying drawings wherein.

Figure 1:
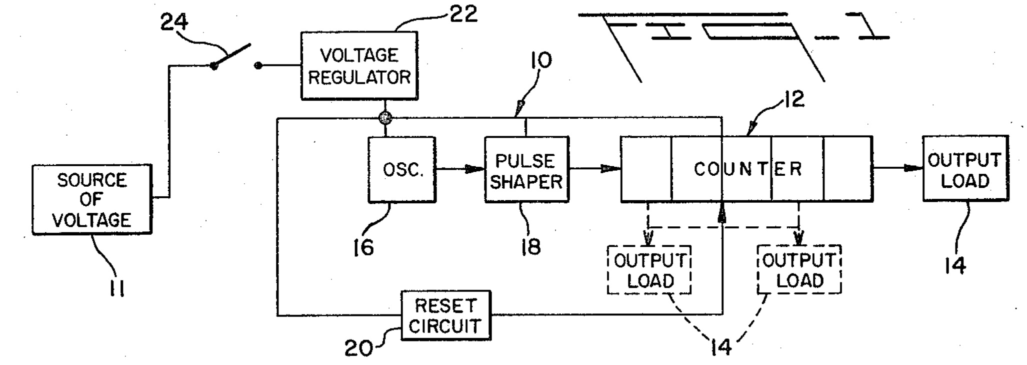
FIGURE 1 is a block diagram of the counter system of the invention.

In the drawings, wherein, for the purpose of illustration, are shown preferred embodiments of the counter system and reset circuit of the invention, the numeral 10 designates the counter system of the invention generally.

Counter system 10 is seen to comprise (FIGURE 1) source of voltage 11, counter 12 having one or more output loads 14, low frequency oscillator 16, pulse shaper 18, reset circuit 20 and voltage regulator 22.

Switch 24 may be manual or automatic or a controlled relay. When switch 24 is closed, voltage is applied to all the units of the counter system and it commences operation. Counter 12 is of the type described in copending application, Ser. No. 391,104, now Patent No. 3,377,-582, and has at least one toroidal core magnetic memory device of the type described in the aforesaid application. At least one output load 14 is connected to counter 12. A plurality of output loads 14 may be connected to the counter. In such a case, there is an output load connected to the desired stage and if this desired stage is other than the final stage, its magnetic memory device delivers an output pulse to both the output load and the next stage upon saturation. Output loads 14 may be switches, counters, visual displays or any other type of device which can be actuated by a pulse.

Figure 3:
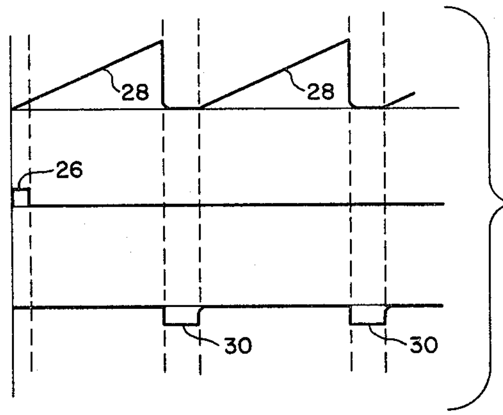
FIGURE 3 is a plot of the voltage of the oscillator cycle against time, of a reset pulse against time and of the output pulses showing the relationship in time duration among the oscillator cycle, the reset pulse and the output pulse.

In order to be sure that no pulse counts remain in counter 12 from a previous operation, reset circuit 20 resets all the toroidal core magnetic memory devices of counter 12 to the condition of zero count. At the same time reset circuit 20 inhibits the outputs of counter 12 to prevent false counting and transmission of false signals to one or more of the output loads 14. The time duration of the reset pulse 26 is much shorter than that of the oscillator cycle time 28 (FIGURE 3) so that the reset operation is completed before the first count pulse is applied to the input of counter 12.

Oscillator 16 is preferably of the type described in my aforesaid Patent No. 3,364,441. It produces output pulses 30 of the desired shape and time duration for application to the counter 12 from a sawtooth pulse of the shape of curve 28 which is generated therein. To ensure that the pulses applied to the counter are as free as practicable of transients and are of the proper shape, amplitude and time duration, the output of oscillator 16 is fed to pulse shaper 18 whose output is then connected to the input of counter 12. Pulse shaper 18 is of the type described in my aforesaid application Ser. No. 532,360, filed of even date herewith.

Reset circuit 20 (FIGURE 2) is seen to comprise transistors 32 and 34 which are connected to source of voltage 11 through switch 24 and preferably also through voltage regulator 22. When switch 24 is closed initially, both transistors 32 and 34 conduit and a signal is fed from transistor 34 to one or more output circuits 36.

Figure 2:
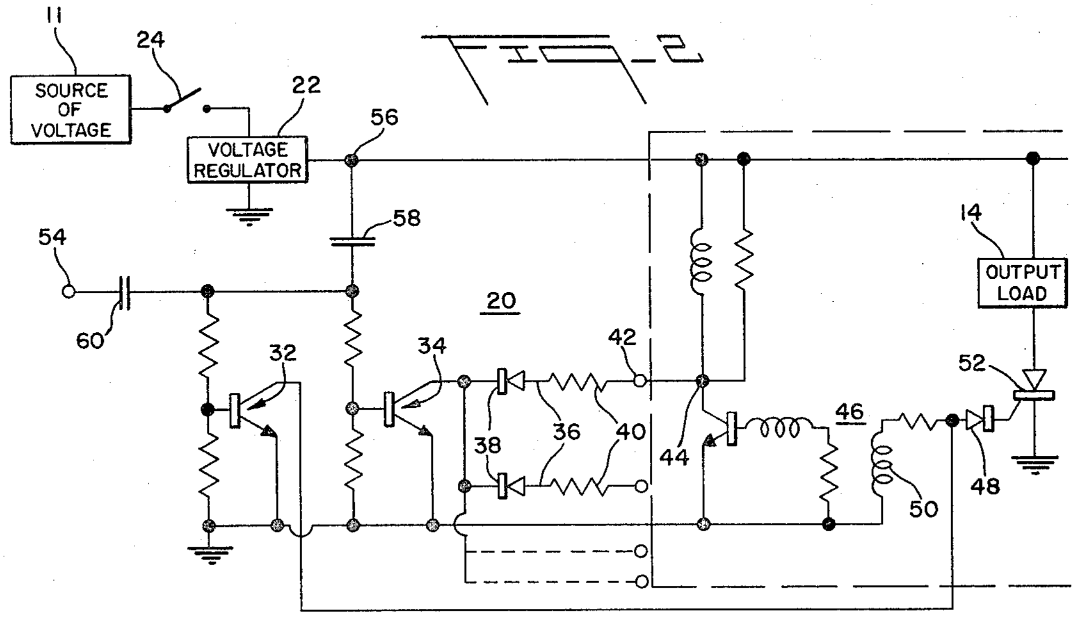
FIGURE 2 is a schematic diagram of the reset circuit used in the counter system of FIGURE 1.

Each output circuit 36 comprises a rectifier 38 and resistor 40 connected in series between the collector of transistor 34 and output terminal 42. Each output terminal 42 is connected to a reset terminal 44 of a counter stage 46, one of which is illustrated at the right of FIGURE 2, enclosed in the dashed lines.

The rectifier 38 and the resistor 40 are used to isolate the various counter stage circuits so that a transient in one of them will not interact with another counter stage 46.

The collector of transistor 32 is connected to rectifier 48 in series with output coil 50 of counter 12. This prevents any false counting during the reset time. The collector of transistor 32 is also connected to the gate of silicon controlled rectifier 52 through diode 48 and serves to ground and close the gate of rectifier 52 during reset time so that rectifier 52 cannot trigger. This prevents a signal from being delivered to output load 14 during reset time. The elements within the portion of FIGURE 2 shown surrounded by the dashed lines are outside the chassis of reset circuit 20 and preferably are located in counter 12. The collector of transistor 32 may be connected to as many output circuits as there are in counter 12.

For proper operation, the reset circuit must generate a pulse of a longer duration than the switching time of the core of the magnetic memory device. When switch 24 is closed, the voltage applied to bus 56 rises to its steady state value and is coupled through capacitor 58 to transistors 32 and 34 which conduct the reset pulse through to their outputs to reset the counter stages to the condition of zero count and to inhibit the transmission of output signals from the counter.

Now, capacitor 58 charges to the full value of the regulator source of voltage and the transistors 32 and 34 become nonconducticve. Since voltage variations on bus 56 might cause a false reset pulse to be generated, voltage regulator 22 is employed to minimize these variations and avoid transmission of a false reset pulse.

Under certain conditions, it is desirable to reset the counter while switch 24 is closed. Then a positive reset actuation pulse is applied to input terminal 54 and is coupled to transistors 32 and 34 through capacitor 60. This changes the voltage on the bases of the transistors sufficiently to cause them to conduct and generate a reset pulse as described heretofore. At the completion of the reset actuation pulse, the transistors stop conducting and counting proceeds.

While preferred embodiments of the invention have been illustrated and described, it is apparent to those skilled in the art that modifications are possible without departing from the spirit and scope of the invention.

The embodiments of the invention in which an exclusive property or privilege is claimed are defined as follows:

1. A counter system comprising:
- a source of voltage;
- a counter having at least one toroidal core, magnetic memory device connected to the source of voltage;
- an oscillator connected to the source of voltage and to the input of the counter such that a pulse is applied thereto;
- a reset circuit connected to the source of voltage and to the counter such that when voltage is initially applied to the counter system, the toroidal core, magnetic memory device of the counter is returned to zero count.

2. A counter system as described in claim 1 including:
- a voltage regulator connected between the source of voltage and the oscillator, the counter, and the reset circuit such that the variation in the voltage applied thereto is minimized.

3. A counter system as described in claim 2 including:
- a pulse shaper connected between the oscillator and the counter such that a count pulse of the proper shape, amplitude and time duration is applied to the counter.

4. A counter system as described in claim 1 including:
- a pulse shaper connected between the oscillator and the counter such that a count pulse of the proper shape, amplitude and time duration is applied to the counter.

5. A counter system as described in claim 4 wherein the reset circuit comprises:
- a first transistor;
- a second transistor;
- a capacitor connected between the source of voltage and the bases of the first transistor and of the second transistor such that both the transistors conduct when voltage is first applied to the reset circuit and both the transistors cease conducting when the capacitor is charged to the full voltage of the source of voltage;
- first means for preventing interaction among the stages of the counter connected between the second transistor and each counter stage such that a core saturating pulse is applied to the counter stage when the second transistor conducts to thereby return each counter stage to a condition of zero count;
- second means for isolating and inhibiting any output signal from the counter connected to the first transistor such that the counter does not transmit an output signal when the toroidal core, magnetic memory devices thereof are returned to the condition of zero count.

6. A counter system as described in claim 3 wherein the reset circuit comprises:
- a first transistor;
- a second transistor;
- a capacitor connected between the source of voltage and the bases of the first transistor and of the second transistor such that both the transistors conduct when voltage is first applied to the reset circuit and both the transistors cease conducting when the capacitor is charged to the full voltage of the source of voltage;
- first means for preventing interaction among the stages of the counter connected between the second transistor and each counter stage such that a core saturating pulse is applied to the counter stage when the second transistor conducts to thereby return each counter stage to a condition of zero count;
- second means for isolating and inhibiting any output signal from the counter connected to the first transistor such that the counter does not transmit an output signal when the toroidal core, magnetic memory devices thereof are returned to the condition of zero count.

7. A counter system as described in claim 2 wherein the reset circuit comprises:
- a first transistor;
- a second transistor;
- a capacitor connected between the source of voltage and the bases of the first transistor and of the second transistor such that both the transistors conduct when volage is first applied to the reset circuit and both the transistors cease conducting when the capacitor is charged to the full voltage of the source of voltage;
- first means for preventing interaction among the stages of the counter connected between the second transistor and each counter stage such that a core saturating pulse is applied to the counter stage when the second transistor conducts to thereby return each counter stage to a condition of zero count;

second means for isolating and inhibiting any output signal from the counter connected to the first transistor such that the counter does not transmit an output signal when the toroidal core, magnetic memory devices thereof are returned to the condition of zero count.

8. A counter system as described in claim 1 wherein the reset circuit comprises:

a first transistor;

a second transistor;

a capacitor connected between the source of voltage and the bases of the first transistor and of the second transistor such that both the transistors conduct when voltage is first applied to the reset circuit and both the transistors cease conducting when the capacitor is charged to the full voltage of the source of voltage;

first means for preventing interaction among the stages of the counter connected between the second transistor and each counter stage such that a core saturating pulse is applied to the counter stage when the second transistor conducts to thereby return each counter stage to a condition of zero count;

second means for isolating and inhibiting any output signal from the counter connected to the first transistor such that the counter does not transmit an output signal when the toroidal core, magnetic memory devices thereof are returned to the condition of zero count.

9. A reset circuit for a counter system comprising a counter having at least one toroidal core, memory device and a source of voltage connected to said counter comprising:

a first transistor;

a second transistor;

a capacitor connected between the source of voltage and the bases of the first transistor and of the second transistor such that both the transistors conduct when voltage is first applied to the reset circuit and both the transistors cease conducting when the capacitor is charged to the full voltage of the source of voltage;

first means for preventing interaction among the stages of the counter connected between the second transistor and each counter stage such that a core saturating pulse is applied to the counter stage when the second transistor conducts to thereby return each counter stage to a condition of zero count;

second means for isolating and inhibiting any output signal from the counter connected to the first transistor such that the counter does not transmit an output signal when the toroidal core, magnetic memory devices thereof are returned to the condition of zero count.

10. A reset circuit as described in claim 9 including input means for applying a reset pulse to the bases of both the first transistor and the second transistor.

11. A reset circuit as described in claim 10 wherein said first means comprises a rectifier connected between the second transistor and a counter stage.

12. A reset circuit as described in claim 11 wherein the counter has at least one output and said second means comprises a gate connected to the output of the counter such that the gate is closed when the first transistor is conducting and a rectifier connected between the output of the counter and the first transistor such that no counts are transmitted when the counter is returned to the condition of zero count.

13. A reset circuit as described in claim 10 wherein the counter has at least one output and said second means comprises a gate connected to the output of the counter such that the gate is closed when the first transistor is conducting and a rectifier connected between the output of the counter and the first transistor such that no counts are transmitted when the counter is returned to the condition of zero count.

14. A reset circuit as described in claim 9 wherein said first means comprises a rectifier connected between the second transistor and a counter stage.

15. A reset circuit as described in claim 9 wherein the counter has at least one output and said second means comprises a gate connected to the output of the counter such that the gate is closed when the first transistor is conducting and a rectifier connected between the output of the counter and the first transistor such that no counts are transmitted when the counter is returned to the condition of zero count.

References Cited

UNITED STATES PATENTS 3,297,987 1/1967 Bailey et al. -------- 340—146.2

JAMES W. MOFFITT, *Primary Examiner.*